United States Patent [19]

Di Gaetano

[11] 3,924,326
[45] Dec. 9, 1975

[54] NUT SHELL CUTTER

[76] Inventor: Dante Di Gaetano, 1021 Old Lane St., Drexel Hill, Pa. 19026

[22] Filed: Aug. 29, 1974

[21] Appl. No.: 501,476

[52] U.S. Cl. .................. 30/120.2; 30/120.1; 30/315
[51] Int. Cl.² ......................................... A47J 43/26
[58] Field of Search ....... 30/120.1, 120.2, 314, 315, 30/301, 302, 303, 305

[56] References Cited
UNITED STATES PATENTS

| | | | |
|---|---|---|---|
| 700,725 | 5/1902 | Bone | 30/301 |
| 2,479,145 | 8/1949 | Werth | 30/305 X |
| 3,005,260 | 10/1961 | Muse | 30/302 |

Primary Examiner—Al Lawrence Smith
Assistant Examiner—J. T. Zatarga
Attorney, Agent, or Firm—Weiser, Stapler & Spivak

[57] ABSTRACT

A nut shell cutter which includes a bottom holding ring of sufficient size to encompass a nut. A yoke rises from the ring and terminates upwardly in a handle. A diametrically oriented knife is affixed to the yoke and has its cutting edge suspended a predetermined distance above the holding ring to facilitate partially cutting through the nut shell.

3 Claims, 5 Drawing Figures

NUT SHELL CUTTER

BACKGROUND OF THE INVENTION

The present invention relates generally to the field of nut treating tools, and more particularly, is directed to a nut shell cutter suitable for use with chestnuts and the like.

In roasting chestnuts, it is necessary to first partially cut the outer shell to expose the meat. Once the shell has been partially severed, the chestnuts are roasted in an oven or over a coal fire for a sufficient length of time to thoroughly heat the nut prior to eating. Chestnuts pose a particular problem that is not generally encountered when heating most nuts. In the case of chestnuts, it is desirable not to remove the meat of the nut from the shell prior to heating as is the common practice with most nuts, but rather, only to partially sever the shell to thereby partially expose the meat of the nut to the heat. Because of this, conventional nut crackers or conventional knives are not suitable in that they are not designed for partial shelling, but rather for completely removing the shell from the nut.

Prior workers in the art have employed knife edges for shell opening purposes as disclosed in U.S. Pat. No. 3,048,208. Other devices have been employed to pierce a shell such as disclosed in U.S. Pat. No. 2,700,994. However, none of the prior workers have developed a knife which is so designed that it can be simply operated in a manner to always only partially cut the nut shell and not completely sever the meat.

SUMMARY OF THE INVENTION

The present invention relates generally to a shell cutting tool, and more particularly, is directed to a nut shell cutter particularly applicable to partially severing the shells of chestnuts and other nuts.

The present invention incorporates a unitary tool including a bottom holding ring of suitable size to encompass a nut, such as a chestnut. A yoke rises from the ring and terminates upwardly in a handle which is preferably fabricated of wood and shaped to provide a broad, striking surface. A knife blade is suspended from the yoke and is diametrically arranged relative to the ring. The knife blade is positioned a predetermined distance above the ring for shell cutting purposes. In use, the ring is applied over and around the nut and the cutting edge of the knife is lowered until it rests upon the top of the nut. Then, by striking the handle a sharp blow, the knife blade will be urged downwardly to partially sever the shell and nut meat. The knife will descend until the ring contacts the same surface as the nut to thereby limit the downward travel of the knife relative to the nut. In this manner, the shell can be easily partially cut to partially expose the nut for roasting purposes.

It is therefore an object of the present invention to provide an improved nut shell cutter of the type set forth.

It is another object of the present invention to provide a novel nut shell cutter including means to hold a nut and means to partially sever the nut shell.

It is another object of the present invention to provide a novel nut shell cutter including a bottom nut holding ring, a yoke rising above the ring and supporting a knife thereon, the yoke terminating upwardly in a broad handle suitable for applying sufficient force to the cutter to sever the nut shell.

It is another object of the present invention to provide a novel nut shell cutter having a bottom holding ring and means to suspend a knife blade a predetermined distance above the ring for shell cutting purposes.

It is another object of the present invention to provide a novel nut shell cutter that is rugged in construction, inexpensive in manufacture and trouble free when in use.

Other objects and a fuller understanding of the invention will be had by referring to the following description and claims of a preferred embodiment thereof, taken in conjunction with the accompanying drawings, wherein like reference characters refer to similar parts throughout the several views and in which:

DESCRIPTION OF THE PREFERRED EMBODIMENT OF THE INVENTION

Figure 1:
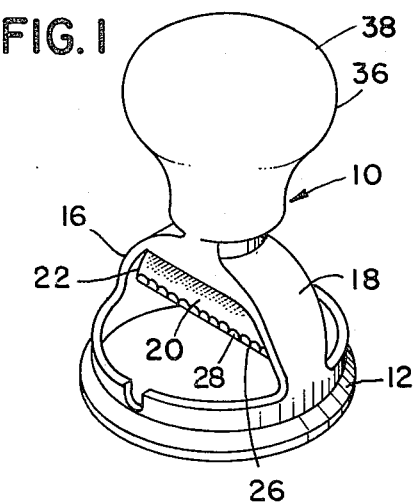
FIG. 1 is a perspective view of a nut shell cutter.
Figure 2:
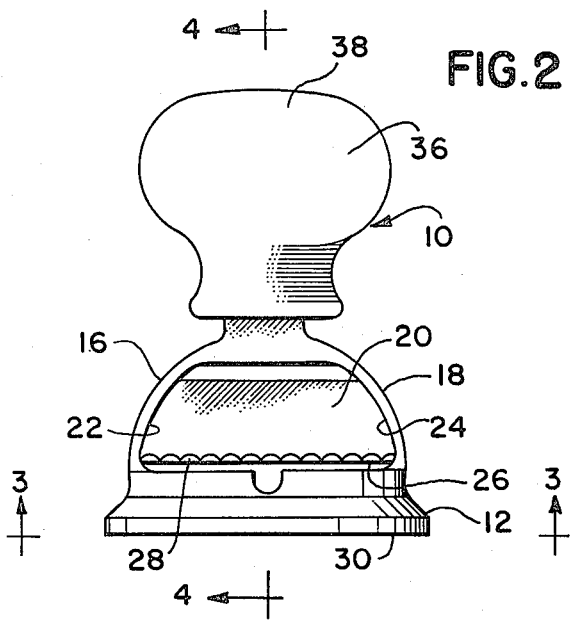
FIG. 2 is an enlarged, side elevational view of the nut shell cutter.
Figure 3:
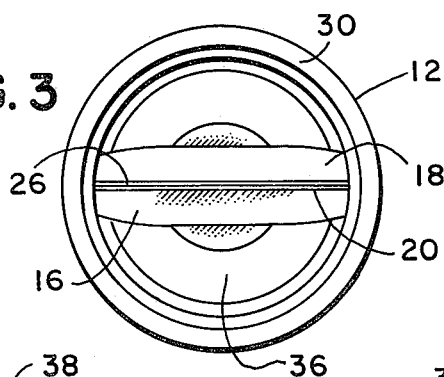
FIG. 3 is a bottom plan view taken from Line 3—3 of FIG. 2, looking in the direction of the arrows.

Although specific terms are used in the following description for the sake of clarity, these terms are intended to refer only to the particular structure of my invention selected for illustration in the drawings and are not intended to define or limit the scope of the invention.

Referring now to the drawings, I show a nut shell cutter generally designated 10 which comprises a bottom holding ring 12 of suitable size to encircle a nut or the like, such as a chestnut 14.

A yoke comprising at least a pair of arms 16, 18 connects to the bottom holding ring 12 and rises upwardly therefrom to form a suitable structure to carry a knife blade 20 in a secure manner. The knife blade 20 comprises a blade of hardened steel which terminates endwardly in fixed connections 22, 24 at the yoke arms 16, 18. The connections 22, 24 may be made in any suitable well known manner such as by spot welding, crimping, brazing or the like as may be necessary to interconnect the blade 20 and the yoke arms 16, 18 in a permanent manner. The knife blade 20 terminates downwardly in a cutting edge 26 which is suitably sharpened or which may be a serrated edge 28 for nut shell cutting purposes. It will be noted that the knife blade 20 is positioned on the yoke arms 16, 18 at a suitable location to space the cutting edge 26 a predetermined distance above the bottom 30 of the bottom holding ring 12. It is contemplated that the cutting edge 26 will be suspended above the holding ring bottom 30 a distance somewhat less than the height of a conventional chestnut 14.

Figure 4:
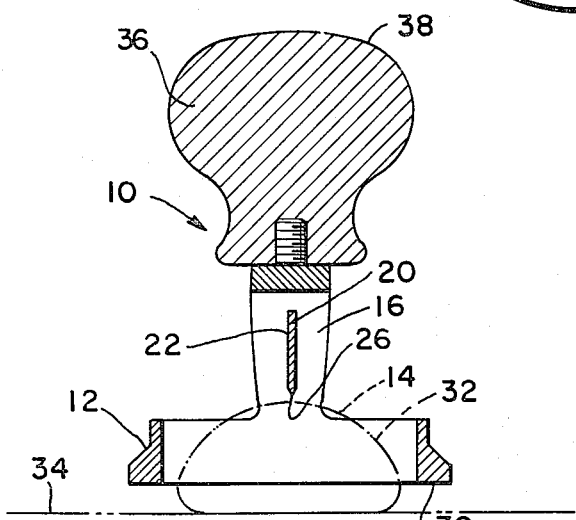
FIG. 4 is a cross sectional view taken along Line 4—4 of FIG. 2, looking in the direction of the arrows and showing a nut in dotted lines prior to partially severing the shell.
Figure 5:
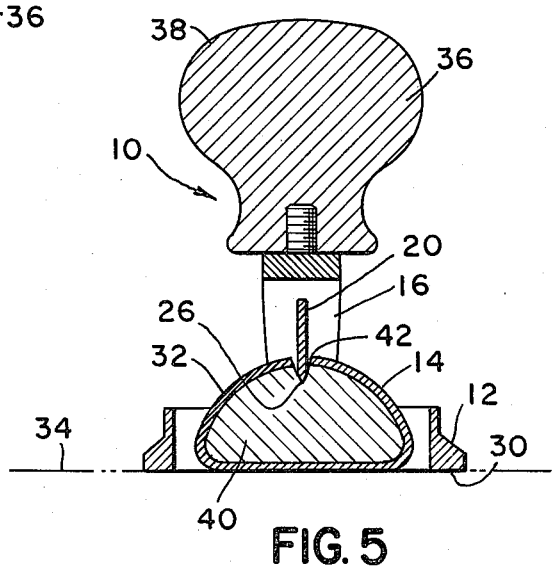
FIG. 5 is a view similar to FIG. 4 showing the cutter in position after it has partially severed the shell of the nut.

Thus, when the nut shell cutter 10 is applied over a chestnut 14 as in FIG. 4, the cutting edge 26 will rest directly upon the nut shell 32 to thereby cause the bottom 30 of the bottom holding ring 12 to be temporarily suspended above the support surface 34 which may be a conventional kitchen table. The yoke arms 16, 18 upwardly terminate at a junction and fixedly connect to a handle 36 which may be fabricated of wood or suitable plastic material. The handle 36 is configured to provide a relatively flat, broad top 38 which is suitable for the application of hand pressure upon the nut 14.

In order to use the nut shell cutter 10 of the present invention, a chestnut 14 or other similar object is placed upon a support surface 34 and then the nut shell cutter 10 is applied over the nut with the bottom holding ring 12 encircling the nut. The cutter 10 is lowered until the knife edge 26 rests upon a portion of the nut shell 32 as best seen in FIG. 4. With the cutter and nut thus positioned, the flat top 38 of the handle 36 can be struck or pressed with the palm of the user's hand (not shown) to force the knife edge 26 directly into the nut shell 32. The application of sufficient pressure upon the handle 36 will result in the cutting edge 26 cutting through the shell 32 in the manner desired. The application of continued downward forces upon the handle 36 causes the knife blade 20 to enter the nut 14 for a predetermined distance until the bottom 30 of the bottom holding ring 12 contacts and stops against the support surface 34. In this manner, by spacing the cutting edge 26 a predetermined distance above the holding ring bottom 30, only a portion of the nut shell 32 will be cut to thereby expose the nut meat 40 through the cut portion 42 the shell 32. By raising or lowering the cutting blade 20 relative to the holding ring bottom 30, the size and depth of the shell cut can be predesigned.

Although I have described the present invention with reference to the particular embodiments herein set forth, it is understood that the present disclosure has been made only by way of example and that numerous changes in the details of construction may be resorted to without departing from the spirit and scope of the invention. Thus, the scope of the invention should not be limited by the foregoing specification, but rather only by the scope of the claims appended hereto.

I claim:
1. In a nut shell cutter for partially cutting the shell of nut as it rests upon a surface, the combination of
   A. positioning means to hold a nut in association with the nut shell cutter,
      1. said positioning means comprising a bottom holding ring having a diameter sufficiently large to encompass the nut,
      2. the said ring having an annular flat bottom for engaging the surface supporting the nut;
   B. a pair of arms rising upwardly from the bottom holding ring and terminating upwardly in a handle receiving junction; and
   C. a cutting blade spaced above the bottom of the bottom holding ring a distance less than the thickness of a nut,
      1. the said blade being a straight blade and being fixedly connected at each end to a respective arm,
      2. the cutting blade having a downwardly directed cutting edge,
      3. the entirety of the cutting edge being spaced from the bottom of the bottom holding ring a distance which is less than the thickness of the nut.
2. The nut shell cutter according to claim 1 wherein the cutting edge of the blade is serrated.
3. The nut shell cutter according to claim 1 wherein the cutting edge is straight.

* * * * *